US005326620A

United States Patent [19]

Arimura et al.

[11] Patent Number: 5,326,620

[45] Date of Patent: Jul. 5, 1994

[54] MULTI-USABLE THERMAL TRANSFER INK SHEET

[75] Inventors: Takao Arimura; Masao Saisho; Jun Sogabe; Katsuhiro Yoshida; Noahiro Ikeda, all of Osaka, Japan

[73] Assignee: Fujicopian Co., Ltd., Osaka, Japan

[21] Appl. No.: 925,016

[22] Filed: Aug. 5, 1992

[30] Foreign Application Priority Data

Aug. 9, 1991 [JP] Japan .................................. 3-200682

[51] Int. Cl.[5] ................................................ B32B 9/00

[52] U.S. Cl. .................................... 428/195; 428/207; 428/212; 428/500; 428/522; 428/913; 428/914

[58] Field of Search ............... 428/195, 913, 914, 323, 428/207, 212, 500, 522

[56] References Cited

U.S. PATENT DOCUMENTS

| | | | |
|---|---|---|---|
| 4,865,901 | 9/1989 | Ohno et al. | 428/195 |
| 4,894,283 | 1/1990 | Wehr | 428/195 |
| 5,051,302 | 9/1991 | Tsuyguchi et al. | 428/195 |

*Primary Examiner*—Patrick J. Ryan
*Assistant Examiner*—William A. Krynski
*Attorney, Agent, or Firm*—Armstrong, Westerman, Hattori, McLeland & Naughton

[57] ABSTRACT

A multi-usable thermal transfer ink sheet comprising a foundation, a heat-meltable, multi-transferable ink layer provided on the foundation, and a heat-meltable overcoat provided on the ink layer, said overcoat having a greater cohesive force than that of said ink layer. A rough paper-adaptability and a resistance to receiving paper-staining are improved with ensuring a desired multi-printing property.

2 Claims, No Drawings

MULTI-USABLE THERMAL TRANSFER INK SHEET

BACKGROUND OF THE INVENTION

The present invention relates to a multi-usable thermal transfer ink sheet. More particularly, it relates to a multi-usable thermal transfer ink sheet designed so that a homogeneous heat-meltable ink layer is transferred in increments relative to the thickness thereof onto a receiving medium at every time when the ink layer is heated by means of a heating means such as a thermal head.

This type of thermal transfer ink sheet which has been proposed heretofore includes one having a multi-transferable, heat-meltable ink layer containing 30 to 60 parts by weight of a heat-meltable resin, 10 to 40 parts by weight of a heat-meltable substance such as wax and 30 to 60 parts by weight of a coloring agent as the essential ingredients (see JP,A, 2-277691).

There have been also proposed those wherein, in the above-mentioned multi-transferable ink layer, the content or melt viscosity of the heat-meltable resin is increased on the side of the foundation and decreased on the side of the surface of the ink layer (see JP,A, 61-79695 and JP,A, 2-150385).

However, these conventional multi-usable transfer ink sheets are not satisfactory because they have drawbacks such as poor clearness of images obtained, particularly, on a paper having a poor smoothness (hereinafter referred to as "rough paper") and occurrence of a remarkable "receiving paper-staining" which means the phenomenon that portions of a receiving paper where the formation of images is not desired are stained with the ink.

It is an object of the present invention to provide a multi-usable thermal transfer ink sheet which can form clear images even on a rough paper and causes no receiving paper-staining, with ensuring a desired multi-printing property.

This and other objects of the present invention will become apparent from the description hereinafter.

SUMMARY OF THE INVENTION

The present invention provides a multi-usable thermal transfer ink sheet comprising a foundation, a heat-meltable, multi-transferable ink layer provided on the foundation, and a heat-meltable overcoat provided on the ink layer, said overcoat having a greater cohesive force than that of said ink layer.

DETAILED DESCRIPTION

The thermal transfer ink sheet of the present invention has a structure wherein, on a conventional multi-transferable ink layer which has a substantially uniform composition relative to the direction of the thickness thereof, is provided a heat-meltable overcoat having a greater cohesive force than that of the ink layer. The cohesive force is expressed, for example, in terms of melt viscosity, melting temperature or hardness. A higher melt viscosity, melting temperature or hardness means a greater cohesive force.

As described above, in the case of the multi-transferable ink layer having a nonhomogeneous composition relative to the direction of the thickness thereof, among conventional ones, the cohesive force, which is expressed in terms of melt viscosity, melting temperature, or the like, of the ink layer is reduced on the side of the ink layer surface.

In contrast with this, in the present invention, a layer having a greater cohesive force expressed in terms of melt viscosity, melting temperature, etc. is provided on the side of the ink layer surface, whereby such outstanding effects that the rough paper-adaptability is good and that the receiving paper-staining does not occur are exhibited with ensuring a desired multi-printing property, though the mechanism thereof is indeterminate.

It is natural to consider that portions of the overcoat which are heated in the first printing are entirely transferred in the first printing because the overcoat is much thinner than the multi-transferable ink layer and therefore the function of the overcoat cannot be exhibited in the second printing and later. In the present invention, however, an unexpected fact that the function of the overcoat is retained even in the second printing and later has been found.

The present invention will be explained more specifically.

Any conventional multi-transferable ink layer can be used as the multi-transferable ink layer in the present invention. From the viewpoint of multi-printing property, a preferred example of the multi-transferable ink layer contains 5 to 40% by weight of an ethylene copolymer resin, 10 to 40% by weight of a softening agent and 30 to 60% by weight of a pigment.

When the proportion of the ethylene copolymer is less than the above range, the amount of the ink transferred at a time increases, so that multi-printing becomes difficult. When the proportion of the ethylene copolymer is more than the above range, cohesive failure is hard to occur in the ink layer in transfer of the ink, so that multi-printing becomes difficult.

The softening agent has the function of reducing the cohesive force of the above-mentioned resin to adjust the cohesive failure of the ink layer. When the proportion of the softening agent is less than the above range, the cohesive failure is hard to occur, so that multi-printing becomes difficult. When the proportion of the softening agent is more than the above range, the amount of the ink transferred at a time increases, so that multi-printing becomes difficult.

The pigment has the function of adjusting of the cohesive failure of the ink layer as well as the function as a coloring agent. When the proportion of the pigment is less than the above range, the cohesive failure hard to occur, so that multi-printing becomes difficult. When the proportion of the pigment is more than the above range, the ink layer becomes brittle and the thermal transfer sensitivity is lowered, so that multi-printing becomes difficult.

The above-mentioned ethylene copolymer resin includes copolymers of ethylene with another vinyl monomer. Examples of the vinyl monomer include vinyl acetate, vinyl butyrate, (meth)acrylic acid, (meth)acrylic acid alkyl esters (wherein the alkyl group is preferably alkyl groups having 1 to 16 carbon atoms, such as methyl, ethyl, propyl, butyl, hexyl, heptyl, octyl, 2-ethylhexyl, nonyl, dodecyl and hexadecyl), acrylonitrile, acrylamide, N-methylolacrylamide and styrene. These vinyl monomers may be used singly or in combination. In the case of ethylene copolymers wherein the vinyl monomer is vinyl acetate, vinyl butyrate or the like, partially hydrolyzed copolymers thereof can also be used. The content of the vinyl monomer in resin is the ethylene copolymer resin is preferably from 10 to 90% by weight. The above-mentioned ethylene copolymer resins may be used singly or in combination. Preferred examples of the ethylene copolymer resin are ethylene-vinyl acetate copolymers and ethylene-alkyl acrylate copolymers. Ethylene-vinyl acetate copolymer is especially preferred.

The above-mentioned softening agent includes, for example, wax-like substances and oily substances.

Examples of the wax-like substances include natural waxes such as haze wax, bees wax, carnauba wax, candelilla wax, montan wax and ceresine wax; petroleum waxes such as paraffin wax and microcrystalline wax; synthetic waxes such as oxidized wax, ester wax, low molecular weight polyethylene and Fischer-Tropsch wax; higher fatty acids such as myristic acid, palmitic acid, stearic acid and behenic acid; higher aliphatic alcohols such as stearyl alcohol and docosanol; esters such as higher fatty acid monoglycerides, sucrose fatty acid esters and sorbitan fatty acid esters; and amides and bisamides such as oleic amide. Preferred examples of the wax-like substance are paraffin wax and microcrystalline wax.

Examples of the oily substances include natural oils such as rapeseed oil, castor oil, coconut oil, sunflower oil, corn oil, linseed oil, safflower oil, lanolin, fish oils, squalane and jojoba oil; petroleum oils such as liquid paraffin, petrolatum, spindle oil and motor oil; surface active agents such as sorbitan oleate, polyoxyethylene fatty acid esters, polyoxyethylene alkylphenyl ethers and polyoxyethylene alkyl ethers; plasticizers such as dioctyl phthalate, tributyl acetylcitrate, dioctyl azelate, dioctyl sebacate, diethyl phthalate and dibutyl phthalate; and oleic acid, lauric acid, linoleic acid, linolenic acid, isostearic acid and the like. Preferred examples of the oily substance are lanolin, petrolatum and liquid paraffin.

The above-mentioned wax-like substances or oily substances may be used singly or in combination.

The above-mentioned pigment includes inorganic pigments and organic pigments. Typical inorganic pigment is carbon black which is preferably used in the present invention. Examples of the organic pigments are as follows.

Yellow pigments:

Naphthol Yellow S, Hansa Yellow 5G, Hansa Yellow 3G, Hansa Yellow G, Hansa Yellow GR, Hansa Yellow A, Hansa Yellow RN, Hansa Yellow R, Benzidine Yellow G, Benzidine Yellow GR, Permanent Yellow NCG, Quinoline Yellow Lake Magenta pigments:

Permanent Red 4R, Brilliant Fast Scarlet, Brilliant Carmine BS, Permanent Carmine FB, Lithol Red, Permanent Red F5R, Brilliant Carmine 6B, Pigment Scarlet 3B, Rhodamine Lake B, Rhodamine Lake Y, Alizarine Lake Cyan pigments:

Victoria Blue Lake, metal-free Phthalocyanine Blue, Phthalocyanine Blue, Fast Sky Blue The multi-transferable ink layer optionally may contain a dispersing agent for improving the dispersibility of pigment, a filler such as diatomaceous earth, talc, silica powder or calcium carbonate, or other additives, in addition to the above-mentioned ingredients.

The overcoat is one which has a greater cohesive force (for example, higher melt viscosity and/or higher melting temperature) than that of the multi-transferable ink layer and preferably is compatible or miscible with the multi-transferable ink layer.

A preferable example of the overcoat contains 50 to 90% by weight of an ethylene copolymer resin and 0 to 50% by weight, more preferably 10 to 30% by weight, of a pigment.

When the content of the ethylene copolymer resin is less than the above range, the clearness of print images formed on a rough paper is not improved and the staining-preventing effect is not sufficiently exhibited. When the content of the ethylene copolymer resin is more than the above range, the optical density of print images obtained in initial printing becomes lower.

It is not necessarily required to incorporate a pigment into the overcoat. However, it is preferable to use a pigment from the viewpoint of increasing the optical density of images obtained in initial printing. In the case that a pigment is used, the content of the pigment in the overcoat is preferably from 10 to 30% by weight. When the content of the pigment is more than 50% by weight, the receiving paper-staining is liable to occur.

In a preferred embodiment of the present invention, the overcoat has a melt viscosity of not less than 2,900 poises at 100° C. (hereinafter the same), especially not less than 10,000 poises and the difference between the melt viscosity of the overcoat and that of the ink layer is not less than 1,000 poises, especially not less than 5,000 poises. When the melt visocisty of the overcoat is less than the above range, the cohesive force of the overcoat is insufficient, so that the rough paper-adaptability becomes poor. When the melt viscosity difference is less than the above range, the rough paper-adaptability and the resistance to receiving paper-staining are not sufficiently exhibited.

As the ethylene copolymer resins for the overcoat, there can be used the same as or those similar to the above-mentioned ethylene copolymer resins for the multi-transferable ink layer. The kind of the ethylene copolymer resin used in the overcoat may be the same as or different from that of the ethylene copolymer resin used in the multi-transferable ink layer.

As the pigments for the overcoat, there can be used the same as or those similar to the above-mentioned pigments for the multi-transferable ink layer. Usually the kind of the pigment used in the overcoat is the same as that of the pigment used in the multi-transferable ink layer.

The overcoat optionally may contain a softening agent, a dispersing agent, a filler or the like, in addition to the above-mentioned ingredients. As these additives, there can be used the same as or those similar to the additives for the multi-transferable ink layer.

The multi-transferable ink layer can be formed by applying to a foundation a coating liquid, which is prepared by dissolving or dispersing the above-mentioned ingredients into an appropriate solvent, or another coating liquid in the form of an aqueous dispersion, an emulsion or the like, by means of an appropriate coating means such as roll coater, gravure coater, reverse coater or bar coater, followed by drying. The multi-transferable ink layer may be formed by a hot-melt coating. The overcoat can be formed in the same manner as above.

The thickness of the multi-transferable ink layer is preferably from about 6 to about 12 $g/m^2$ from the viewpoint of ensuring the desired multi-printing property. The thickness of the overcoat is preferably from about 0.2 to about 1.5 $g/m^2$. When the thickness of the overcoat is less than the above range, the function of the overcoat is not sufficiently exhibited, which results in failure to obtain clear images on a rough paper and occurrence of receiving paper-staining. When the thickness of the overcoat is more than the above range, the optical density of images obtained in initial printing is decreased.

A variety of plastic films commonly used as a foundation film for this type of ink sheet, including polyester films such as polyethylene terephthalate film and polyethylene naphthalate film, polyamide film, aramid film, and the like can be used as the foundation in the present invention. In the case of using such plastic films, there is preferably provided on the rear surface of the foundation (the surface in sliding contact with a heating head) a conventional stick-preventing layer composed of one or more of various lubricative heat-resistant resins such as silicone resin, fluorine-containing resin nitrocellulose, other resins modified with foregoing lubricative heat resistant resins, and mixtures of the foregoing resins with lubricating agents, in order to prevent the foundation from sticking to the heating head. Antistatic agent and other additives may be contained in the foundation and/or the stick-preventing layer. High density thin papers such as condenser paper can also be used as the foundation. The thickness of the foundation is preferably from about 1 to about 9 μm, more preferably from about 2 to about 6 μm from the viewpoint of good heat conduction.

The present invention is more specifically described and explained by means of the following Examples. It is to be understood that the present invention is not limited to the Examples, and various changes and modifications may be made in the invention without departing from the spirit and scope thereof.

EXAMPLES 1 to 4

Onto the front surface of a polyester film having a thickness of 4.5 μm provided with a stick-preventing layer having a coating amount of 0.1 g/m$^2$ composed of a silicone-modified urethane resin on the rear surface thereof was applied each coating liquid prepared by dissolving or dispersing each composition shown in Table 1 into a mixed solvent of benzene-ethyl acetate, followed by drying to form a multi-transferable ink layer having the physical properties shown in Table 1.

Each coating liquid prepared by dissolving or dispersing each composition shown in Table 2 into a mixed solvent of toluene-methyl cellosolve was applied onto the above-mentioned multi-transferable ink layer, followed by drying to form an overcoat having the physical properties shown in Table 2, thereby yielding a thermal transfer ink sheet.

TABLE 1

| | Ex. 1 | Ex. 2 | Ex. 3 | Ex. 4 |
|---|---|---|---|---|
| Composition (% by weight) | | | | |
| EVA (MI 400)*1 | 30 | 25 | 30 | 30 |
| Paraffin wax (m.p. 50° C.) | 30 | 12 | 12 | 18 |
| Lanolin | 9 | 20 | 8 | 12 |
| Homogenol (dispersing agent made by Kao Corporation) | 1 | 1 | 1 | 1 |
| Carbon black | 30 | 42 | 49 | — |
| Brilliant Carmine 6BA | — | — | — | 39 |
| Physical property | | | | |
| Viscosity (poise/100° C.)*2 | 1,000 | 3,000 | 4,000 | 3,000 |
| Softening temp. by DSC(°C.) | 45 | 47 | 49 | 47 |

TABLE 1-continued

| | Ex. 1 | Ex. 2 | Ex. 3 | Ex. 4 |
|---|---|---|---|---|
| Coating amount (g/m$^2$) | 9 | 9 | 9 | 9 |

*1 EVA means an ethylene-vinyl acetate copolymer and the term in the parentheses means that the melt index is 400 (hereinafter the same).
*2 Value measured by means of a rheometer made by Rheology Co., Ltd. (hereinafter the same).

TABLE 2

| | Ex. 1 | Ex. 2 | Ex. 3 | Ex. 4 |
|---|---|---|---|---|
| Composition (% by weight) | | | | |
| EVA (MI 400) | 71 | — | — | — |
| EVA (MI 150) | — | 71 | — | — |
| EVA (MI 15) | — | — | 71 | 77 |
| Homogenol (dispersing agent made by Kao Corporation) | 1 | 1 | 1 | 1 |
| Silica powder | 10 | 10 | 10 | — |
| Carbon black | 18 | 18 | 18 | — |
| Brilliant Carmine 6BA | — | — | — | 22 |
| Physical property | | | | |
| Viscosity (poise/100° C.) | 3,000 | 12,000 | 40,000 | 36,000 |
| Softening temp. by DSC(°C.) | 53 | 60 | 63 | 62 |
| Coating amount (g/m$^2$) | 0.5 | 0.5 | 0.5 | 0.5 |

COMPARATIVE EXAMPLE

The same procedures as in Example 2 except that the same multi-transferable ink layer as in Example 2 was formed on the above-mentioned polyester film but no overcoat was formed on the multi-transferable ink layer, were repeated to give a thermal transfer ink sheet.

Each of the thermal transfer ink sheets obtained above was subjected to printing tests on a thermal printer (PCPR printer made by NEC Corporation) and the following properties were evaluated. With respect to the receiving paper, a paper having a Bekk smoothness of 300 seconds was used in the tests for multi-printing property, print image quality and receiving paper-staining, and a paper having a Bekk smoothness of 30 seconds was used in the test for rough paper-adaptability. The results are shown in Table 3.

(1) Multi-printing property

It was determined what times print images having an optical density of more than a given value could be obtained when printing was conducted using the same portion of the ink sheet and the results were ranked according to the following evaluation values.

3 Print images having an OD value of not less than 0.7 were obtained four times.
2 Print images having an OD value of not less than 0.7 were obtained twice.
1 Print images having an OD value of not less than 0.7 were not obtained twice or more.

(2) Print image quality

The print images obtained on the receiving paper (smooth paper) were observed by the naked eye and the results were ranked according to the following evaluation values.

3 Print images which were clear and not blurred or spread were obtained.
2 Print images which were blurred or spread but readable were obtained.
1 Only non-readable print images or spread were obtained.

(3) Receiving paper-staining

The stain on the receiving paper ( smooth paper) after printing was evaluated by the naked eye and the results were ranked according to the following evaluation values.

3 No stain was observed.

2 The receiving paper was stained slightly, by which the quality of the print image was not affected adversely.

1 The receiving paper was stained extremely, by which the quality of the print image was ruined markedly.

(4) Rough paper-adaptability

The print image obtained on the receiving paper (rough paper) were observed by the naked eye and the results were ranked according to the following evaluation values.

3 Clear images with no voids and no dropout portions were obtained.

2 Readable print images wherein there are voids but dropout portions were few were obtained.

1 Print images had a large number of dropout portions and were hardly readable.

TABLE 3

| | Ex. 1 | Ex. 2 | Ex. 3 | Ex. 4 | Com. Ex. |
|---|---|---|---|---|---|
| Multi-printing property | 2 | 3 | 3 | 3 | 3 |
| Print image quality | 2 | 3 | 3 | 3 | 2 |
| Receiving paper-staining | 3 | 3 | 3 | 3 | 2 |

TABLE 3-continued

| | Ex. 1 | Ex. 2 | Ex. 3 | Ex. 4 | Com. Ex. |
|---|---|---|---|---|---|
| Rough paper-adaptability | 2 | 3 | 3 | 3 | 1 |

In addition to the materials and ingredients used in the Examples, other materials and ingredients can be used in the Examples as set forth in the specification to obtain substantially the same results.

What we claim is:

1. A multi-usable thermal transfer ink sheet comprising a foundation, a heat-meltable, multi-transferable ink layer provided on the foundation, and a heat-meltable overcoat provided on the ink layer, said overcoat having a greater cohesive force than that of said ink layer, wherein the multi-transferable ink layer is a layer containing 5 to 40% by weight of a copolymer of ethylene with another vinyl monomer, 10 to 40% by weight of a softening agent and 30 to 60% by weight of a pigment, and the overcoat is a layer containing 50 to 90% by weight of a copolymer of ethylene with another vinyl monomer and 0 to 50% by weight of a pigment, the melt viscosity measured at 100° C. of the overcoat is not less than 2,900 poises and the difference between the melt viscosity measured at 100° C. of the overcoat and the melt viscosity measured at 100° C. of the ink layer is not less than 1,000 poises.

2. The ink sheet of claim 1, wherein the pigment is carbon black.

* * * * *